United States Patent Office 2,904,148
Patented Sept. 15, 1959

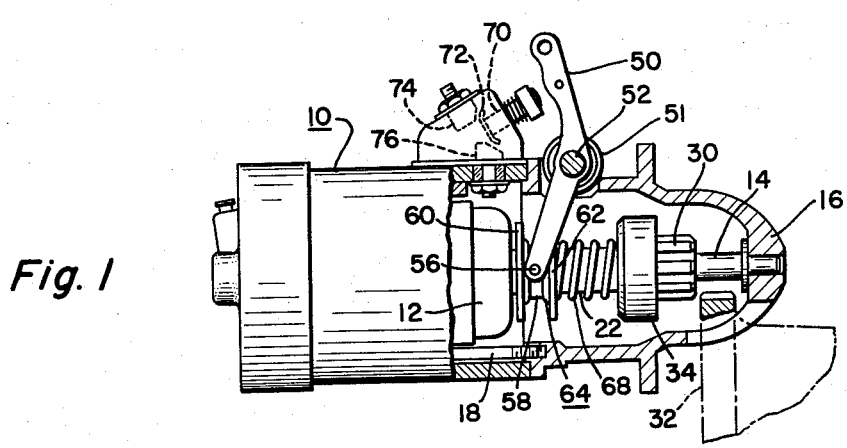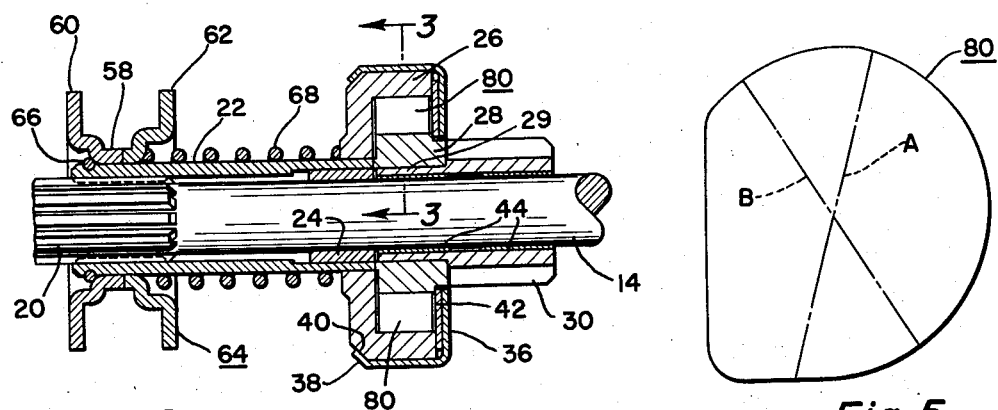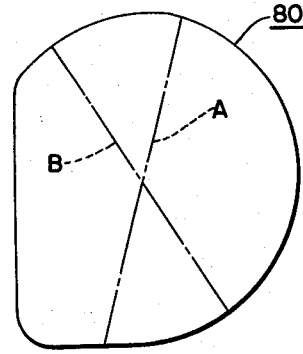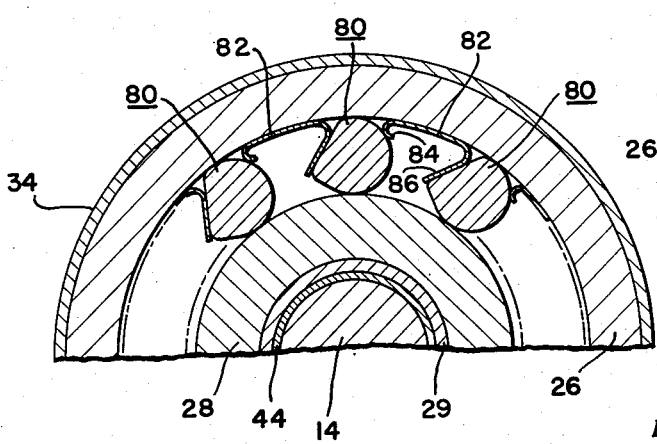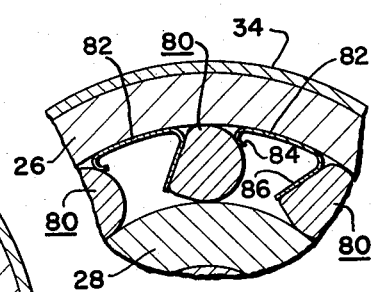

2,904,148

CLUTCH FOR AN ENGINE STARTING DEVICE

Paul L. Schneider, Harold J. Cromwell, and William H. Taylor, Anderson, Ind., assignors to General Motors Corporation, Detroit, Mich., a corporation of Delaware Application February 3, 1954, Serial No. 407,997

1 Claim. (Cl. 192—45.1)

This invention relates to engine starting devices and one-way overrunning clutches designed particularly for use with starting motors to effect driving connection between such motor and the engine flywheel gear and to interrupt such connection when the engine starts to run under its own power.

Engine starting apparatus now in common use for automotive vehicles includes a motor, a driving pinion movable into mesh with the engine flywheel gear and an overrunning clutch for operatively connecting the motor and pinion which is released when the engine becomes self-operative and the pinion overruns the motor. Such clutch generally comprises two concentric shells connected to the motor and pinion respectively between which rollers are received and which have a wedging action with camming surfaces formed on one or the other of the shells to establish a driving connection between the two shells. When the engine starts the driven shell overruns the driving shell and the clutch is released.

According to the present invention instead of providing camming surfaces on one of the shells which comprise the clutch and rollers cooperating therewith, the clutch is of the sprag type in which the surfaces of both the driving and driven shells is smooth and cylindrical throughout and positioned between the shell are a plurality of tiltable gripping elements of irregular form which establish a driving connection between the shells when tilted in one direction, but permit free rotation of the shells relative to each other when tilted in the opposite direction, and also permit free rotation of the shells relative to each other when the driven shell is rotated faster than the driving shell.

An object of the present invention is to provide a clutch of the character referred to which is simple in construction with a minimum of parts, positive in action and inexpensive to manufacture.

It has been found that in large installations, such as heavy trucks or buses, for example, the starting motor load is so heavy that, because of torque limitations, the conventional overrunning motor clutch is not entirely satisfactory. The heavy load causes a tendency for the clutch to slip. This produces wear, wear increases the tendency to slip and so on. It is, therefore, a further object of the present invention to provide a starting motor having a driving clutch of the one-way overrunning type with a maximum driving torque so that it will operate with heavy loads without slippage and with minimum wear, but which will release easily and immediately when the associated engine starts to run under its power.

Further objects and advantages of the present invention will be apparent from the following description, reference being had to the accompanying drawings, wherein a preferred embodiment of the present invention is clearly shown.

In the drawings:

Fig. 1 is a longitudinal view, partly in section, of an engine starting motor and associated clutch in which the present invention is embodied.

Fig. 2 is a longitudinal view, partly in section, of the clutch and associated parts comprising the starter drive.

Fig. 3 is a section on the line 3—3 of Fig. 2.

Fig. 4 is a detail section similar to Fig. 3, but showing the gripping elements of the clutch in different position.

Fig. 5 is an enlarged detail view of one of said gripping elements.

A clutch constructed according to the present invention is shown in the drawings associated with an engine starting motor of conventional construction having a field frame 10, a rotating armature 12 and a rotating shaft 14 on which the armature is supported and which rotates therewith. The motor is of entirely conventional construction and need not be further described.

The left end of the motor shaft 14, as seen in Fig. 1, is suitably journaled in an end plate (not shown) secured to the field frame 10 and the right end of such shaft is journaled in the wall of a housing 16 which houses the clutch and driving pinion and is suitably secured to the field frame by bolts 18.

The shaft 14 has external splines 20 formed thereon which cooperate with internal splines on a sleeve 22 which is slidable on the shaft 14. This sleeve has a bearing 24 journaled on a smooth portion of the shaft 14. The right end of the sleeve 22 supports an outer clutch ring 26 which is welded or otherwise secured to the sleeve 22. This ring has a part normal to the axis of the sleeve and a part 26y parallel to the axis, the inner surface of which has the same diameter throughout, forming a cylindrical surface. Spaced from the outer clutch ring 26 is an inner clutch ring 28, the outer diameter of which is the same throughout, forming a cylindrical surface which is concentric with the surface of the outer ring 26. The inner clutch ring 28 is secured in any suitable way to a sleeve 29 integral with the pinion 30. The sleeve 22 is movable to move the pinion into engagement with the flywheel gear 32, shown in Fig. 1, by means later described and is operative to rotate said gear to start the engine when the outer ring 26 is rotatably connected to the inner ring 28, if the pinion is in engagement with said gear and the starting motor is energized.

The inner and outer clutch rings are maintained in assembled relation by a metal shell having a part 34 surrounding and engaging the outer surface of the outer clutch ring 26 and a part 36 normal thereto which is provided with a central opening through which the end of the inner shell extends. The retaining shell has an inwardly bent part 38 which engages a beveled surface 40 formed on the outer clutch ring 26 and a washer 42 having a central opening that surrounds the sleeve 22 is positioned between the part 36 and the right end of the outer clutch ring 26, and also between the part 36 and a shoulder formed by the inner clutch ring 28. Obviously, this retaining shell will prevent any axial movement of the outer clutch ring and pinion relative to the inner clutch ring and driving sleeve.

Pinion bearings 44 are journaled on the shaft 14 between the pinion and said shaft. The whole clutch assembly is moved to the right, as shown in Fig. 1, by a lever 50, held in the normal position shown in the drawings by a torsion spring 51 and pivoted on a shaft 52 secured in any suitable way in the housing 16. The sleeve 22 is slidable on shaft 14 for this purpose, but is rotatable by the shaft in any position it may occupy through the medium of splines 20. The lower end of lever 50 is bifurcated so as to provide two arms each of which has a pin 56. These pins engage a groove 58 on opposite sides of the motor shaft, said groove being formed between two flanges 60 and 62 of a collar 64 slidable on the sleeve 22 and normally held in the position shown in the drawings by a split ring 66 which engages a suitable groove in the outer surface of sleeve 22.

Movement of the collar 64 to the right, in Fig. 1, exerts pressure on a spring 68 positioned between the collar 64 and shell 26, which effects movement of the clutch assembly and pinion to the right. If the teeth of the pinion 30 do not abut the teeth of the flywheel gear 32 as the pinion is moved to the right, such pinion moves freely into engagement with the flywheel gear without opposition and when fully engaged, the starting motor switch is closed and rotation of the motor effects rotation of the flywheel gear until the engine is started. When this takes place, the engine moves the inner clutch member faster than the outer clutch member is rotated by the motor, the clutch is released, as previously indicated, the lever 50 is returned to its original position by spring 51, effecting disengagement of the pinion and stopping of the motor.

If, upon movement of the clutch assembly and pinion to the right, the teeth of the pinion abut those of the flywheel gear, continued movement of the lever 50 will compress the spring 68 until the lever effects closing of the starting motor switch. This will cause rotation of the motor and pinion. Just as soon as the latter starts to rotate, it moves out of position where its teeth abut those of the flywheel gear into proper meshing position. The spring 68 will immediately expand, forcing the pinion into proper engagement with the flywheel gear, after which the action will be as previously described.

As shown in the drawings, the lever 50 is adapted to be manually operated by any suitable form of operating connection which may be pivotally connected to the upper end of said lever. As the lever is moved to effect engagement of the pinion with the flywheel gear, the upper part of the lever, after a predetermined movement thereof, engages a spring held plunger 70 which carries a movable contact 72. Further movement of lever 50, after engagement thereof with the plunger 70, moves the contact 72 into engagement with two fixed contacts 74 and 76 to close the starting motor circuit and cause the motor to rotate and crank the engine. When the lever is released, the spring 51 returns it to normal position, opening the motor circuit and disengaging the pinion 30 from the flywheel gear 32.

At the present time, closing of the motor circuit and movement of the clutch and pinion assembly is generally effected by an electromagnet which is rendered operative upon closing of the ignition switch, or a special manually operable push button or other instrumentality. Such an operating mechanism is not shown herein, but the lever 50 may be operated by such a magnet instead of manually. A mechanism of this character is shown in the patent to Dyer, No. 2,105,643, issued January 18, 1938, in which Fig. 2 shows such a magnet energized upon closing of the ignition switch and Fig. 3 shows a magnet which is not energized until a special manually operable switch is closed. Either of these arrangements could be substituted for the manual control shown and the function of lever 50 would be the same.

As previously indicated, whenever the starting motor is energized and the pinion 30 engaged with the engine gear 32, the engine will be rotated by the starting motor, if the sleeve 22 is rotatably connected to the pinion 30. To effect this connection, the outer clutch ring 26, which is the driving member of the clutch and is connected permanently with the driving sleeve 22, is connected in driving relation with the inner clutch ring 28, which is the driven member of the clutch, through the medium of a series of tiltable, irregularly shaped elements 80, generally known as sprags. These elements are spaced from each other and positioned between the elements 80 are springs 82. These springs engage the tiltable elements on either side thereof and exert pressure on both said elements tending to tilt them into gripping position as will be apparent upon consideration of Fig. 3. The end 84 of spring 82 engages the upper part of the element 80 at the left of the spring and the end 86 of such spring engages the lower part of the element 80 to the right so that the spring obviously tends to tilt both elements counterclockwise. For reasons more fully pointed out later if the outer clutch member 26 is rotated counterclockwise as shown in Fig. 3, the sprags will be tilted to effect driving engagement between the inner and outer clutch rings and consequent rotation of the pinion 32. If the outer clutch ring is rotated in a clockwise direction, the sprags will not grip and there will be no driving connection between the outer and inner rings 26 and 28. Likewise, if the inner ring is rotated counterclockwise by the engine at a speed greater than the speed of rotation of the outer ring, the sprags will be tilted by the inner ring, in a direction to prevent them from gripping, so that the driving relation between inner and outer clutch rings will be interrupted as soon as the engine starts to operate under its own power and the clutch is released so that the engine does not rotate the motor between the time it becomes self-operative and the time the pinion is disengaged from the flywheel gear.

The elements 80 are of a length substantially equal to the width of the clutch rings, are of the irregular form shown in Fig. 3 and are positioned in the annular space between the inner and outer clutch rings.

The action of the sprags should be clearly apparent upon consideration of Fig. 5, in which one of the sprags is shown on an enlarged scale. The distance along line A is greater than along line B. Therefore, the sprag must tilt in a counterclockwise direction in order to establish a driving connection between the two clutch rings 26 and 28. If tilted in the other direction, the two rings will simply be freely rotatable relative to each other.

As already stated, the springs 82 exert forces tending to tilt the elements 80 to gripping position. Also when the outer clutch ring is rotated counterclockwise as seen in Fig. 3, the friction between the ring and the sprags tends to tilt all the sprags toward the gripping position. Therefore, when the motor circuit is closed, the sprags are tilted as above described to effect a driving connection between the inner and outer clutch rings and rotatably connect the driving pinion to the motor driven sleeve 22.

As already indicated, although the clutch described is of more or less general application, such clutch is of particular value when used with an engine starting motor to establish driving connection between such motor and the engine flywheel gear and, as a matter of fact, the clutch was primarily designed for this purpose. In heavy duty installations where large engines, which are hard to crank, are started, the driving torque of the conventional roller clutch is not as great as might be desirable which is probably due largely to the limited number of rollers which can be employed. This results in some slippage of the clutch where the load is very heavy. Slippage increases the wear and increase in wear, of course, increases the amount of slippage. The driving torque of the clutch, such as disclosed herein, has been found to be considerably greater than that of a conventional roller clutch of the same size and cost and a starting motor driving the engine through such a clutch can handle heavier loads more satisfactorily than when used with a standard roller clutch, with less slippage and less wear and yet will release easily and quickly when the engine becomes self-operative and the driven member of the clutch overruns the driving member.

While the embodiment of the present invention as herein disclosed, constitutes a preferred form, it is to be understood that other forms might be adopted.

What is claimed is as follows:

A one-way, overrunning clutch for establishing driving connection between a prime mover and mechanism operated thereby, said clutch comprising spaced inner and outer clutch rings, one of which is a driving member adapted to be operatively connected to the prime mover and the other of which is a driven member adapted to be operatively connected to said mechanism, a plurality of spaced tiltable gripping elements positioned in the annular space between the inner and outer clutch rings, each gripping element having a flat side extending substantially coextensively with the gripping element and having an opposite side which is curved and further having curved end surfaces which respectively engage said inner and outer rings, and a plurality of separate springs each of which is positioned between and engages adjacent gripping elements, each spring having a central section extending coextensively with and engaging a portion of said outer ring and having a flat end portion engaging the flat side of a gripping element and a curved end portion engaging a curved portion of a gripping element, said curved portion of said spring being of a short length as compared to the length of said spring and engaging one gripping element at a point closely adjacent the outer ring, said flat end portion of said spring engaging the flat portion of an adjacent gripping element at a point spaced inwardly from the point of engagement of said curved portion of said spring with said one gripping element, whereby said gripping elements are urged to gripping position by said springs acting on inner and outer portions of said gripping elements.

References Cited in the file of this patent

UNITED STATES PATENTS

| | | |
|---|---|---|
| 1,642,645 | Constantinesco | Sept. 13, 1927 |
| 1,820,945 | McGrath | Sept. 1, 1931 |
| 2,001,668 | Maier | May 14, 1935 |
| 2,245,431 | Critchfield | June 10, 1941 |
| 2,599,793 | Warner | June 10, 1952 |
| 2,630,896 | Dodge | Mar. 10, 1953 |
| 2,684,139 | Lewis | July 20, 1954 |
| 2,705,066 | Szady | Mar. 29, 1955 |
| 2,827,992 | Hein | Mar. 25, 1958 |

FOREIGN PATENTS

| | | |
|---|---|---|
| 298,673 | Great Britain | Oct. 15, 1928 |